Nov. 28, 1950     J. T. KING     2,532,105
LAWN MOWER
Filed Jan. 2, 1946     3 Sheets-Sheet 3
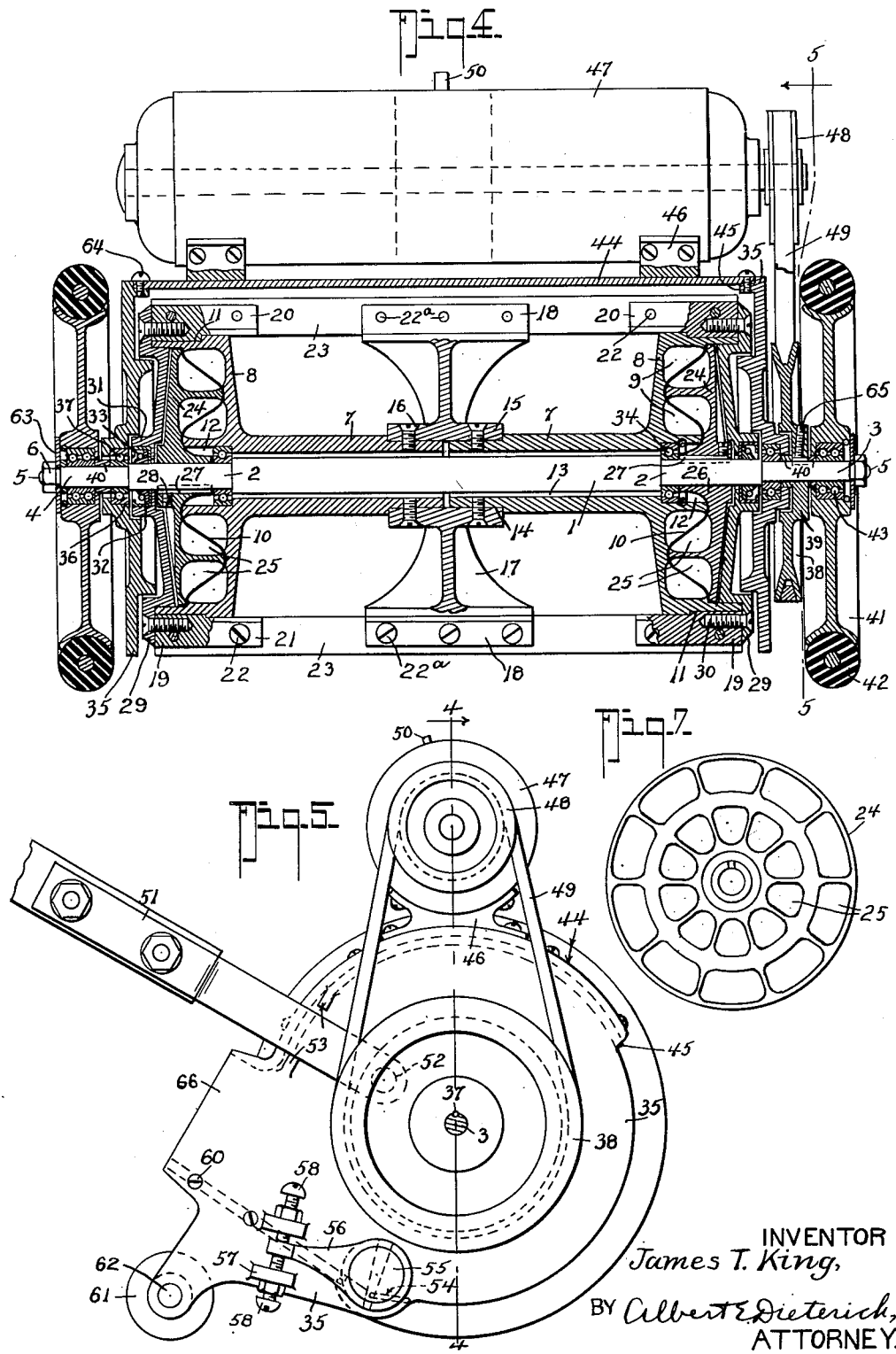
INVENTOR
James T. King,
BY Albert E. Dieterich,
ATTORNEY.

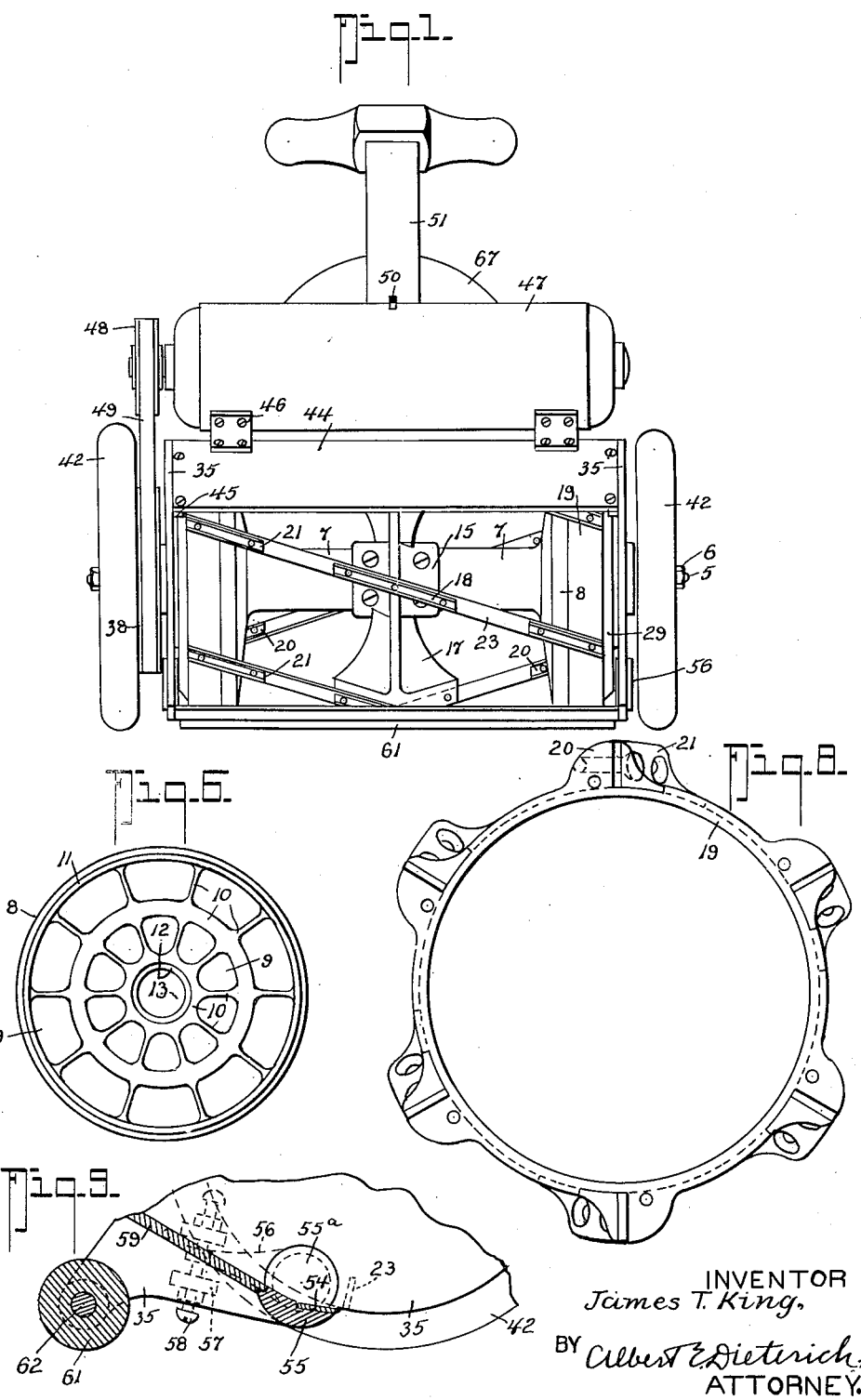

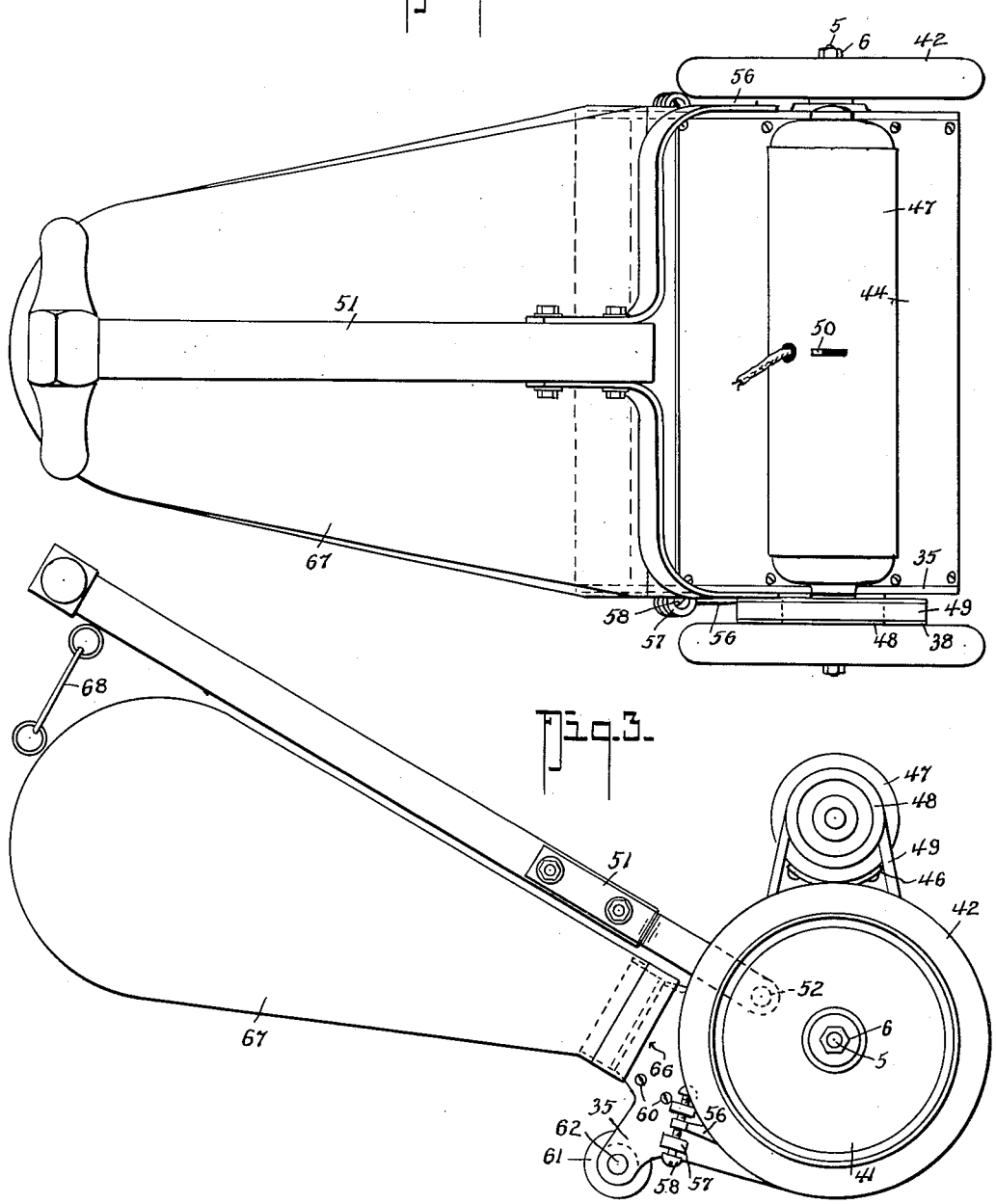

Patented Nov. 28, 1950

2,532,105

UNITED STATES PATENT OFFICE 2,532,105

LAWN MOWER

James T. King, Burbank, Calif.

Application January 2, 1946, Serial No. 638,637

9 Claims. (Cl. 56—26)

1

The present invention relates to lawn mowers of the manually pushed type such as are usually employed to cut the grass on the lawns of private dwellings and apartments.

Objects of the invention are:

1. To provide a lawn mower whose cutting reel is driven by a suitable motor operating via a fluid drive.

2. To provide a lawn mower of light weight (say, fifty pounds or less) which requires but little effort to push it over the lawn.

3. To provide a fluid drive for lawn mower reels which, under impulse starting, will be more flexible owing to the cushioned action of the fluid drive; this cannot be said for other lawn mowers that use direct geared or chain or belt drives through an additional train of gears.

4. To provide a lawn mower with an electric motor drive to which no sudden loads are transmitted and hence no sudden loads will be imposed on the available electric supply system and the danger or inconvenience of a blown fuse is eliminated.

5. To provide a lawn mower or rotor whose parts (except the cutting and shearing blades) can be die-cast, and after they shall have been assembled the rotor unit can be kinetically and statically balanced on a bench test.

6. To provide a lawn mower whose reel has a center support, as well as end supports, for the shearing blades and whose center support is provided with a plurality of inclined blower vanes which ensures that all grass cut will be blown to the rear of the machine; this induced blower action also disposes of dead leaves, weeds and cut grass during the actual trimming of the lawn.

7. To provide a lawn mower whose cutting blades are easily removed and replaced when necessary or desirable and whose stationary blade is adjustable up and down, forwardly and backwardly.

8. To provide a lawn mower which is practically silent when in use.

9. In general, to improve, simplify, and reduce the cost of manufacture and maintenance of a lawn mower, and to provide a mower which can be used by any member of an average or normal family.

Other objects will in part be obvious and in part will be pointed out hereinafter.

To the attainment of the aforesaid objects and ends invention also resides in the novel details of construction, combination, and arrangement of parts which will hereinafter be first fully described and then will be specifically pointed out

2 in the appended claims, reference being had to the accompanying drawings, in which:

Fig. 1 is a front elevation of a lawn mower embodying the present invention.

Fig. 2 is a top plan view of the same.

Fig. 3 is a side elevation of the same.

Fig. 4 is a part section and part elevation of the same on approximately the line 4—4 of Fig. 5.

Fig. 5 is a sectional view on the line 5—5 of Fig. 4.

Fig. 6 is an end elevation of one of the rotor spool halves.

Fig. 7 is an elevation of the cap or cover for the same.

Fig. 8 is a detail elevation of one of the side rings which carry the shearing blades.

Fig. 9 is a detail sectional view, later specifically referred to.

In the drawings, in which like numerals of reference indicate like parts in all the figures, 1 represents the axle of the machine on which the ground wheels 41 turn freely on antifriction bearings 43 held on the reduced portions 3 and 4 of the shaft by washers 63 and nuts 6 on the reduced ends 5.

The shaft 1 has reduced portions 2 on which antifriction bearings 34 are placed and on which the end caps or covers 24 of the rotor are keyed, as at 27, and held against axial movement by set screws 28.

The rotor includes two spool-like half bodies, each of which includes a hub 7 and an end head 8, the latter being provided with liquid-holding pocket portions 9. The caps or covers 24 have similar pocket portions 25 which register at times with the pocket portions 9. The opposing faces of the heads 8 and caps 24 are formed to operatively fit together along a path 10 that, in cross section is of zigzag or undulating form, as best shown in Fig. 4, to increase or lengthen the parting line. The pocket portions 9 of each member 8 and 24 are shown in two circular rows with the pocket portions in radial alignment (Fig. 6).

The heads 8 are bored to provide a free passage 13 for the shaft 1 and are counterbored as at 12 to receive the antifriction bearing 34 and a portion of the hub, 26, of the cap or cover 24 (see Fig. 4). The ends of the hubs 7 opposite one another are reduced, as at 14, to fit into the hub 15 of a combined blade support and blower or fan. The fan is secured to the hub ends by screws 16 and includes the vanes 17 and the lugs 18 to which the shearing blades 23 are secured by screws 22ª.

The heads 8 have flanges 11 on which rings 19 are force-fitted and retained. The rings 19 have a suitable number of properly arranged and positioned blade-holding lugs 20 to which the blades 23 are secured by clamping lugs 21 and screws 22. For convenience of illustration, the lugs 20 and 18 have been shown as going in a straight-across direction; in practice, however, they will be inclined somewhat so as to give to the blades 23 a slightly inclined or spiral direction, as is common in lawn mowers and as is indicated in Fig. 1.

End plates 29 fit into the head flanges 11 and over the ends of the lugs 21 and blades 23. The plates 29 are secured in place by screws 30.

The plates 29 have hubs 31 which have recesses 32 to receive oil seals 33 of any approved construction. Side frames 35, having bearing-receiving recesses 36 for shaft bearings 37, are connected by a shell plate 44 secured by screws 64 to the flanges 45 of the frames 35.

A suitable motor is mounted on the plate 44 by brackets 46. This motor may be an internal combustion engine or an electric motor—an electric motor being preferred, as shown. The electric motor used will be a constant torque motor, consisting of two halves with the condenser, and control switch 50, mounted in the center of the motor casing 47. As the motor is of known construction, it has not been illustrated in detail. The motor drives the rotor by means of pulleys 48, 38, and belt 49. The pulley 38 is secured by its hub 39 to shaft 1 by means of a key and set screw 65. Proper spacers 40 are provided where necessary.

The wheels 41 are preferably provided with solid rubber tires 42.

A suitable handle 51 is pivoted at 52 to the side plates or frames 35 and has its pivotal movement restricted between lugs 53.

The stationary cutting blade 54 is secured to a cross bar 55 having trunnions 55a held in bearing holes in the frames 35 and carrying adjusting arms 56 which operate between adjusting screws 58 carried by lugs 57 on the frames 35. A plate 59 is adjustably held to the rear of blade 54 between the frames 35 by screws 60 and provides, with the frame extensions 66, a discharge nozzle to which a catching bag 67 may be secured. The outer end of the bag may be supported from the handle 51 by any suitable means, as at 68.

The spool pockets 9, 25, having been filled with a suitable fluid, when the motor in the motor casing 47 is energized, rotation of shaft 1 (and consequently the caps 24) will, through the fluid-clutch action, impart rotation to the rotor (composed of spool 7, 8, rings 19, cutting blades 23 and plates 29) so long as current is turned on, regardless of the speed with which the mower is being pushed over the ground.

A rear roller 61 is mounted on a shaft 62 that turns in bearings in the frames 35 (see Figs. 3 and 5). As the rotor turns, the fan blades will set up a draught toward the bag 67 and blow the cuttings, etc., into the same.

From the foregoing it will be seen that this carefully engineered design will provide an economical, easy-to-use appliance, free from maintenance troubles and the usual excessive service costs now prevalent in other mowers on the market.

What I claim is:

1. In a lawn mower wherein ground wheels are mounted on an axle, a cutting reel freely mounted on said axle, a hydraulic drive comprising a driving element secured to said axle and a driven element forming a part of the cutting reel, and a hydraulic fluid contained within the cutting reel in cooperative association with said driving and driven elements.

2. A lawn mower according to claim 1 wherein the cutting reel includes a rotor mounted to turn on said axle and including side plates, rings secured to said side plates, cutting blades secured to said rings, a driving element secured to said axle and a driven element secured to said one of said rings, said driving and said driven elements having fluid-containing pockets and means for turning said axle to drive said rotor.

3. In a lawn mower: an axle; a frame having bearings for said axle; a cutting reel freely rotatably mounted on said axle; a hydraulic clutch between said axle and said reel; and means to drive said axle, said hydraulic clutch having a driving member secured to said axle and a driven member forming a part of said reel.

4. In apparatus of the class described, the improvement which includes: an axle; a spool having a head at each side provided with hydraulic-fluid-receiving pockets; means mounting said spool on said axle for free rotation thereon; a cap for each head having fluid-receiving pockets for cooperation with the pockets of said heads; means securing said caps to said axle for rotation with the same; a frame including side plates in which said axle is freely rotatable and lug-carrying rings secured to said side plates and immovably mounted on said heads and cutting blades secured to said lugs and connecting said rings together; a hydraulic fluid in said pockets; and means to drive said axle.

5. The improvement of claim 4 wherein said blades are further supported by a fan mounted on the spool.

6. The improvement of claim 4 wherein the parting surfaces between the pocketed heads and their caps are of undulated outline in cross section.

7. In apparatus of the class described an improved cutter reel and drive means therefor, the same comprising a driven shaft on which ground wheels are freely mounted for supporting the shaft; a spool having end heads provided with oil pockets; means for freely mounting said spool on said shaft; rotor-caps having oil pockets for cooperation with said oil pockets of said end heads, said rotor-caps being secured to said driven shaft; end plates connected with said end heads as a closure for the same; bearings between said end plates and said driven shaft; and hydraulic fluid in said oil pockets serving as a fluid connection between said end heads and said rotor caps.

8. In apparatus of the class described an improved cutter reel and drive means therefor, the same comprising a driven shaft on which ground wheels are freely mounted for supporting the shaft; a spool having end heads provided with oil pockets; means for freely mounting said spool on said shaft; rotor-caps having oil pockets for cooperation with said oil pockets of said end heads, said rotor-caps being secured to said driven shaft; end plates connected with said end heads as a closure for the same; bearings between said end plates and said driven shaft; and hydraulic fluid in said oil pockets serving as a fluid connection between said end heads and said rotor caps, said bearings being in limited communication with said hydraulic fluid.

9. The improvement according to claim 4, wherein the spool is composed of a right and a left section; a fan mounted on and connecting said sections together to function as one; and cutting blades connecting said lug-carrying rings and said fan together.

JAMES T. KING.

REFERENCES CITED

The following references are of record in the file of this patent:

UNITED STATES PATENTS

| Number | Name | Date |
|---|---|---|
| 108,069 | Wagner | Oct. 4, 1870 |
| 1,116,390 | Davis | Nov. 10, 1914 |
| 1,669,471 | Jones | May 15, 1928 |
| 1,782,636 | Stokes | Nov. 25, 1930 |
| 1,858,514 | Lell | May 17, 1932 |
| 1,939,851 | Horste | Dec. 19, 1933 |
| 2,171,761 | Paradise et al. | Sept. 5, 1939 |
| 2,315,130 | Peterson | Mar. 30, 1943 |